United States Patent
Treuchot

(10) Patent No.: US 10,715,279 B2
(45) Date of Patent: Jul. 14, 2020

(54) METHODS OF GUARANTEED RECEPTION OF COMMON SIGNALS IN AN AVIONICS SYSTEM COMPRISING A PLURALITY OF ELECTRONIC COMPUTERS

(71) Applicant: THALES, Courbevoie (FR)

(72) Inventor: Stéphane Treuchot, Pessac (FR)

(73) Assignee: THALES, Courbevoie (FR)

( * ) Notice: Subject to any disclaimer, the term of this patent is extended or adjusted under 35 U.S.C. 154(b) by 32 days.

(21) Appl. No.: 15/625,844

(22) Filed: Jun. 16, 2017

(65) Prior Publication Data

US 2017/0366302 A1    Dec. 21, 2017

(30) Foreign Application Priority Data

Jun. 21, 2016   (FR) ..................... 16 00984

(51) Int. Cl.
| | |
|---|---|
| H04L 1/16 | (2006.01) |
| G06F 11/18 | (2006.01) |
| G06F 11/16 | (2006.01) |
| G06F 11/30 | (2006.01) |
| H04L 7/04 | (2006.01) |
| H04L 12/407 | (2006.01) |
| H04L 12/40 | (2006.01) |

(52) U.S. Cl.
CPC ........ H04L 1/1607 (2013.01); G06F 11/1687 (2013.01); G06F 11/182 (2013.01); G06F 11/3006 (2013.01); G06F 11/3027 (2013.01); H04L 7/048 (2013.01); H04L 12/407 (2013.01); *H04L 2012/4028* (2013.01)

(58) Field of Classification Search
CPC combination set(s) only.
See application file for complete search history.

(56) References Cited

U.S. PATENT DOCUMENTS

| | | |
|---|---|---|
| 4,718,002 A | 1/1988 | Carr |
| 5,528,761 A | 6/1996 | Ooba et al. |
| 6,374,286 B1 * | 4/2002 | Gee .......................... G06F 9/262 |
| | | 710/260 |

(Continued)

FOREIGN PATENT DOCUMENTS

| | | |
|---|---|---|
| EP | 2 709 010 A1 | 3/2014 |
| FR | 2 925 191 A1 | 6/2009 |

*Primary Examiner* — Khaled M Kassim
*Assistant Examiner* — Syed Ali
(74) *Attorney, Agent, or Firm* — Baker & Hostetler LLP

(57) ABSTRACT

Methods of guaranteed reception and of processing of a digital signal in an avionics system comprise a plurality of computers, each computer comprising processing electronics and a software layer, which, on receipt of an event, carries out the following steps: at a first instant, sending to each of the other computers of a first signal (ACK) of reception of the event; at a second instant termed "TimeOut ACK", if the electronic computer has not received one of the first signals emanating from one of the other computers, sending of a second failure signal (FAIL) to each of the other computers; at a third instant termed "TimeOut GARANTEED", if a second failure signal has been received by the computer, absence of taking into account of the event by the computer and if no failure signal has been received by the computer, taking into account of the event by the data processing electronics of the computer.

5 Claims, 4 Drawing Sheets

(56) References Cited

U.S. PATENT DOCUMENTS

| | | | | |
|---|---|---|---|---|
| 7,020,076 B1* | 3/2006 | Alkalai | ............... | H04L 1/22 |
| | | | | 370/217 |
| 7,254,637 B2* | 8/2007 | Pinkerton | ............... | H04L 29/06 |
| | | | | 709/230 |
| 10,149,340 B1* | 12/2018 | Rabii | ............... | B64D 11/00153 |
| 2004/0210847 A1* | 10/2004 | Berson | ............... | G01D 7/08 |
| | | | | 715/788 |
| 2009/0122812 A1* | 5/2009 | Steiner | ............... | H04J 3/0652 |
| | | | | 370/503 |
| 2011/0255528 A1* | 10/2011 | Zakrzewski | ............... | H04J 3/0667 |
| | | | | 370/350 |
| 2014/0029617 A1* | 1/2014 | Wang | ............... | H04L 45/38 |
| | | | | 370/392 |
| 2017/0039858 A1* | 2/2017 | Wang | ............... | G10L 25/51 |

* cited by examiner

METHODS OF GUARANTEED RECEPTION OF COMMON SIGNALS IN AN AVIONICS SYSTEM COMPRISING A PLURALITY OF ELECTRONIC COMPUTERS

CROSS-REFERENCE TO RELATED APPLICATIONS

This application claims priority to foreign French patent application No. FR 1600984, filed on Jun. 21, 2016, the disclosure of which is incorporated by reference in its entirety.

FIELD OF THE INVENTION

The field of the invention is that of electronic and digital architectures of software-intensive avionics systems.

BACKGROUND

Such an architecture is represented in FIG. 1. It comprises at least electronic devices IHMC which are essentially man-machine control interfaces and several electronic computers C. The devices are linked to the various computers by means of a first data bus FB known by the name "Field-Bus". Hereinafter in the text, the data sent by the devices are called "events". Once processed, the events are dispatched by the various electronic computers on a second data bus DB or "Data-Bus" so as to be taken into account by the various devices of the avionics system.

The various computers C react to the external events in two possible ways. In a first mode of operation, each computer processes the various events. The computers are independent. In a second mode of operation, each computer processes at least one event common to another computer to the benefit of one and the same defined function. There is then dependency between the computers.

In the latter case, the overall coherence of the system requires synchronization of the computers. The synchronization is both temporal and functional. The synchronization must be functional in so far as the processed events are the same. The synchronization must be temporal because the events perceived by the computers must be actually perceived in the same order so as to safeguard the integrity and the coherence of the system and because the temporal perception jitter is constrained by the overall latencies of the system.

Several solutions are possible for ensuring this synchronization. This need for integrity or synchronism in a system is often covered by a dedicated hardware solution which can be, for example, a bus redundancy and/or a common physical clock and/or control by one or more master systems. In most applications, only one of its solutions is implemented. By way of example, patent FR 2 925 191 entitled "Architecture de traitement numérique à haute intégrité à multiples ressources supervisées" ["High-integrity digital processing architecture with multiple supervised resources"] describes a digital architecture comprising two synchronized computation pathways comprising a supervision module supporting in a parametrizable manner various modes of comparison of the data of the said pathways.

In the mass-market sector, the standardized Internet protocol "NTP", the acronym standing for "Network Time Protocol", allows the synchronization of the clocks of several systems.

However, it remains unusual to address this need for synchronization in a system whose intrinsic technological properties do not ensure it. Moreover, the solution must address the specific constraints of the aeronautical sector, that is to say strong determinism, low latency and a low impact on the network.

A possible solution consists in having an a posteriori approach which consists in correcting the errors as they occur. One of the drawbacks of this method is that the corrections are necessarily specific since they rest upon the functional nature of the errors. Another drawback is that it is difficult to demonstrate completeness of the error cases processed. Finally, the latency in case of errors may be significant since the system potentially passes through several successive unstable states.

SUMMARY OF THE INVENTION

The method according to the invention does not exhibit these drawbacks. It consists in adding an identical and simple software "layer" to all the computers. The essential function of this software layer is to exchange with the other computers synchronization data relating to the physical events received by each computer by the fieldbus. The events are processed only when each computer knows that all the other computers have indeed received the event.

More precisely, the subject of the invention is a method of guaranteed reception and of processing of an "event" in the form of a digital signal in an avionics system comprising a plurality of electronic computers linked together by a data bus, each computer comprising data processing electronics, characterized in that each electronic computer comprises one and the same software layer, which, on receipt of an event, carries out the following steps:

At a first instant, sending to each of the other electronic computers of a first signal attesting the reception of the said event by the said electronic computer, one and only one of the electronic computers sending a stamp representative of the said first instant;

At a second instant termed "TimeOut ACK", if the said electronic computer has not received at least one of the first signals emanating from one of the other electronic computers, sending of a second so-called failure signal to each of the other electronic computers attesting the absence of reception of the said first signal;

At a third instant termed "TimeOut GARANTEED", if a second so-called failure signal has been received by the said electronic computer, absence of taking into account of the event by the said electronic computer and if no failure signal has been received by the said electronic computer, taking into account of the event according to the temporal order defined by the stamp by the data processing electronics of the said electronic computer.

Advantageously, when two events of the same functional value are sent successively, the second event is taken into account by the software layers of the electronic computers only if the previous event is abandoned or processed by the data processing electronics of the said electronic computers.

Advantageously, the plurality of electronic computers operating in a cyclic manner, the number of cycles elapsing between the reception of the physical event and the possible taking into account by the various processing electronics of the electronic computers is of the order of five.

Advantageously, the event emanates from the man-machine interfaces of the avionics system.

BRIEF DESCRIPTION OF THE DRAWINGS

The invention will be better understood and other advantages will become apparent on reading the nonlimiting description which follows and by virtue of the appended figures among which.

DETAILED DESCRIPTION

Figure 1:
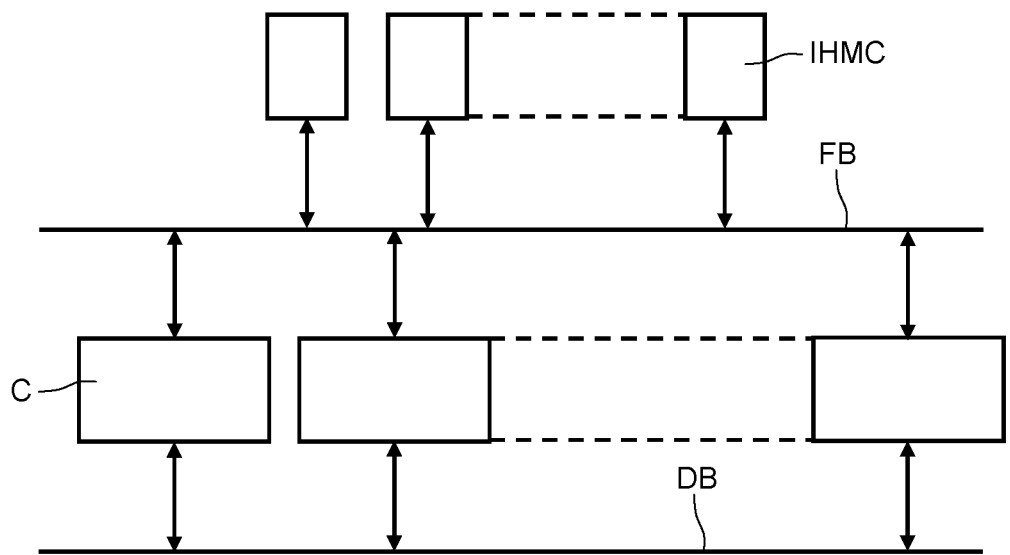
FIG. 1 represents the general electronic architecture of an avionics system.

The method according to the invention is implemented in a system architecture such as represented in FIG. 1. It comprises electronic devices which are essentially man-machine control interfaces and several electronic computers. By way of example, the control interfaces are generally control keyboards. The number of computers of the avionics system is denoted N. In a typical avionics system, the number N of computers is between four and eight. The devices are linked to the various computers by means of a first data bus known by the name "Field-Bus". The data sent by the devices are called "events". By way of example, an event corresponds to a user tapping a key of a keyboard.

Each electronic computer comprises data processing electronics. Once processed, the events are dispatched by the various electronic computers on a second data bus or "Data-Bus" so as to be taken into account by the various devices of the avionics system.

Figure 2:
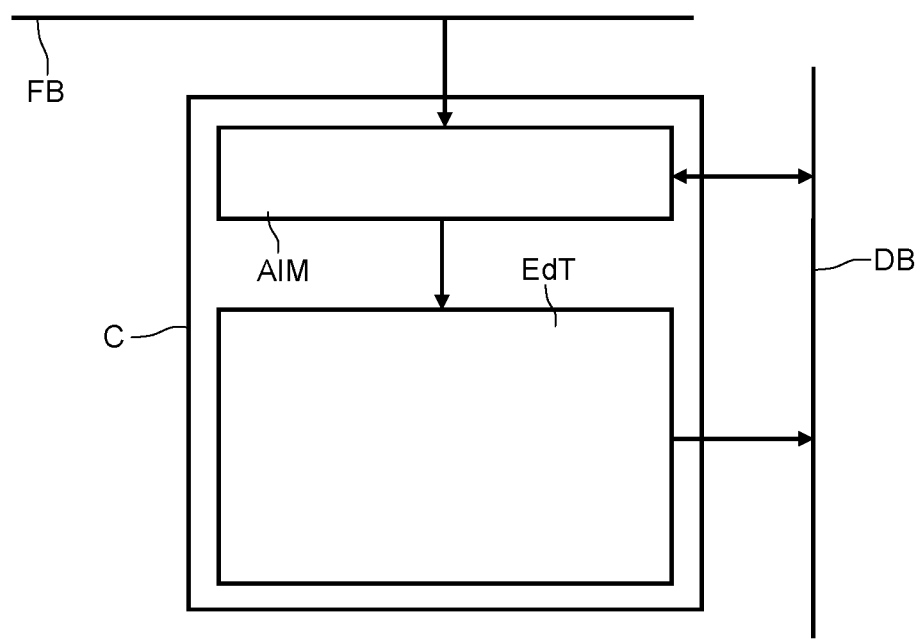
FIG. 2 represents the architecture of a computer implementing the method of guaranteed reception according to the invention.

In the method according to the invention, as represented in FIG. 2, each computer C comprises a software layer or instance called "AIM", the acronym standing for "Asynchronism & Integrity Manager" disposed upstream of the processing electronics EdT and whose function is to guarantee perfect reception of the various events before they are processed. Upon each reception of a new event, each AIM software layer dialogues with the other AIM software layers of the other computers and, as a function of this dialogue, transmits or otherwise the event to the processing electronics EdT of the electronic computer C.

Figure 3:
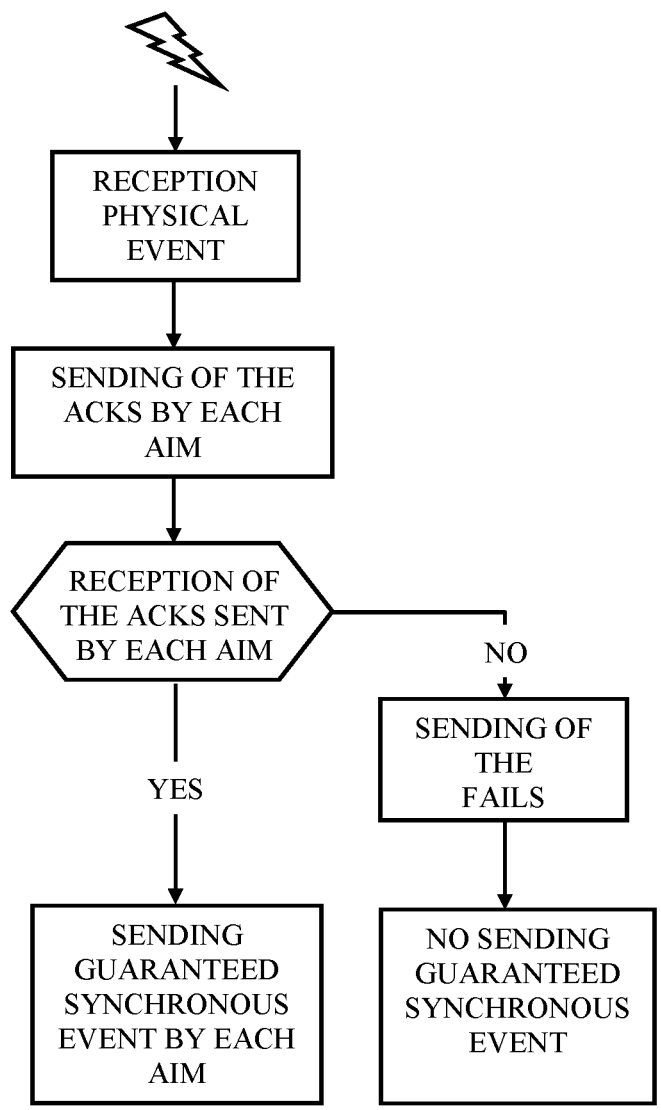
FIG. 3 represents the main steps carried out by the software layer according to the invention.

Each time that an electronic computer receives an event, its AIM software layer carries out the following steps, as illustrated in FIG. 3. In this figure, the physical event is represented by a flash.

At a first instant, a first signal termed "ACK" attesting the reception of the event by the said electronic computer is sent to each of the other electronic computers by the AIM instance. One and only one of the electronic computers plays the role of "stamper" or logical clock. This stamper computer sends a stamp representative of the said first instant. This stamp is necessary to ensure the sending of the guaranteed events in a unique order. The physical events are then reordered according to this order during the guaranteed synchronous event. The choice of this computer is arbitrary. The stamp is sent simultaneously with the signal ACK.

Consequently, if everything operates properly, the N computers all send a signal ACK originating from the other computers and each computer therefore receives N−1 signals ACK.

At a second instant termed "TimeOut ACK", if an electronic computer has not received at least one of the first signals ACK emanating from one of the other electronic computers, it sends a second so-called failure signal or "FAIL" to each of the other electronic computers attesting the absence of reception of the said first signal. The second instant is computed in such a way that the signals ACK can reach the various computers.

At a third instant termed "TimeOut GARANTEED", if a second failure signal has been received by the electronic computers, the latter, in their entirety, do not take the event into account, and it is therefore not processed by the various electronic computers. If, on the contrary, no failure signal has been received by the set of electronic computers, the various data processing electronics of the electronic computers take the event into account. Stated otherwise, the failure of a single link gives rise to the absence of taking into account of the event. A highly secure system is thus obtained.

Figure 4:
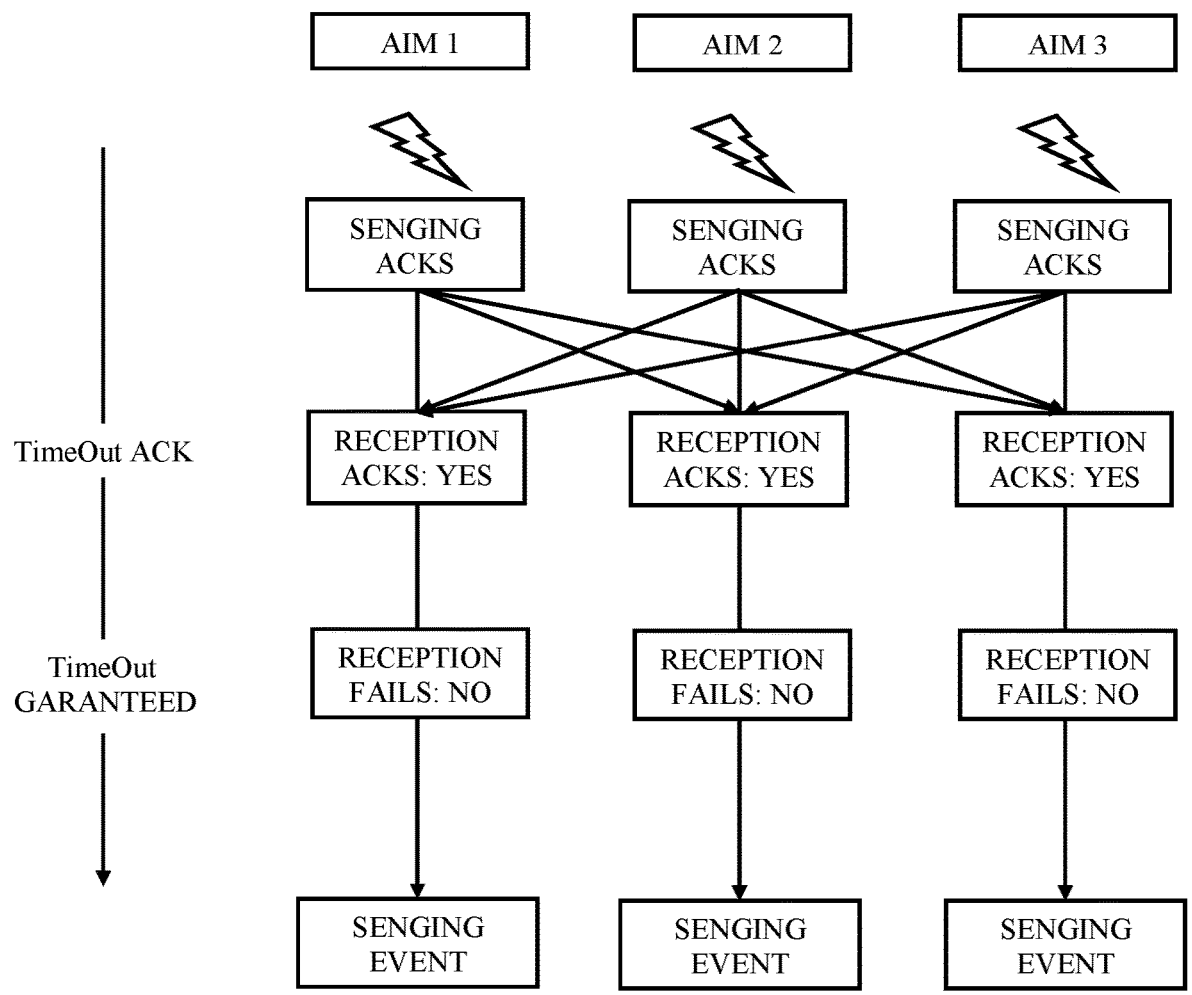
FIGS. 4 and 5 represent the implementation of the software layer according to the invention depending on whether an exterior event is or is not received correctly.
Figure 5:
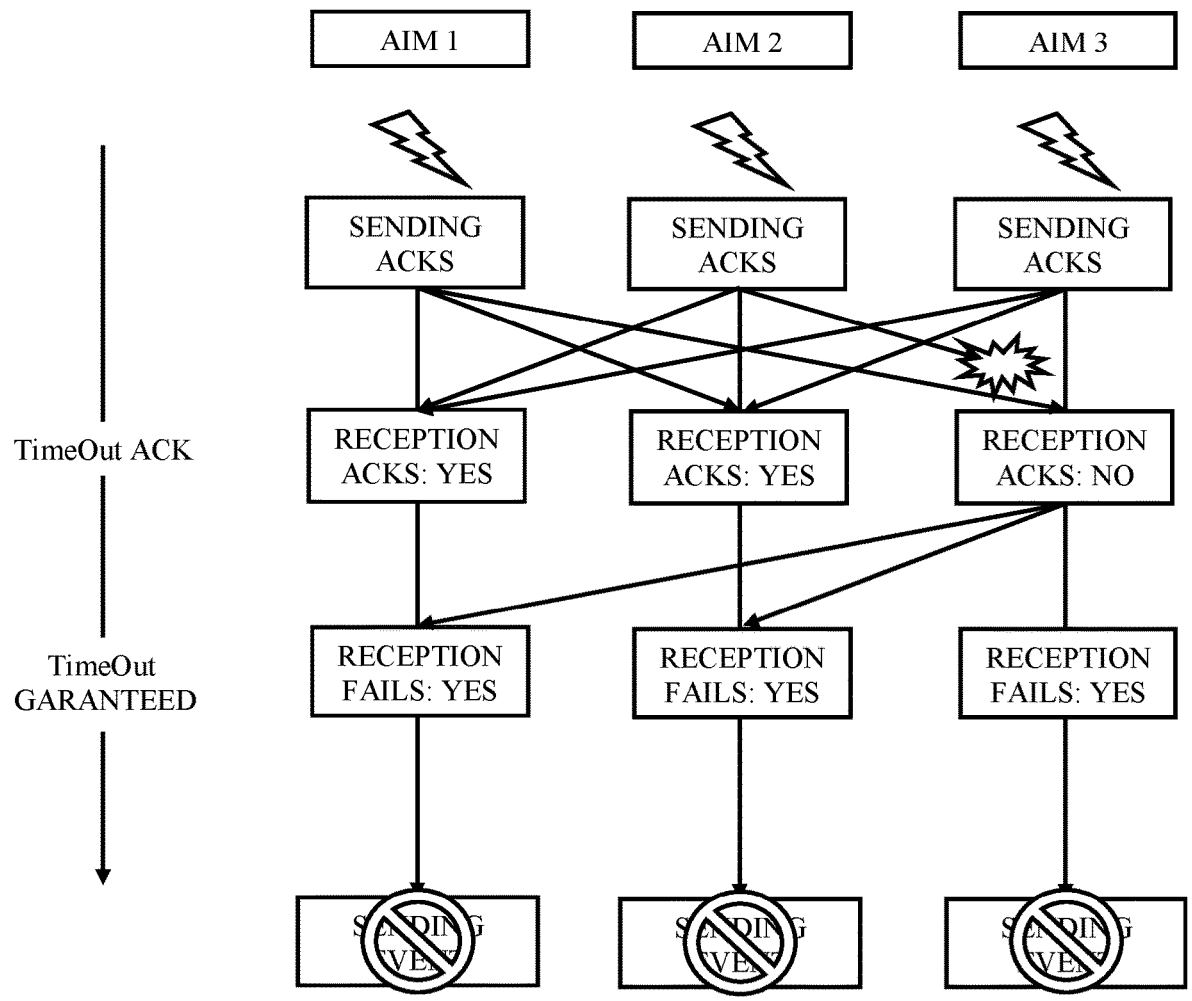

FIGS. 4 and 5 illustrate the various steps of the method in the simple case of a system comprising three electronic computers. Each computer comprises an AIM instance. These are denoted AIM1, AIM2 and AIM3.

In the case of FIG. 4, everything operates perfectly. Upon reception of an event, the three instances AIM1, AIM2 and AIM3 send their respective signals ACK to the other two instances. Thus, the instance AIM1 sends to AIM2 and AIM3. At the instant "TimeOut ACK", the three instances therefore receive confirmation of the event by the other two instances. Consequently, they do not send any failure signal "FAIL". At the instant termed "TimeOut GARANTEED", the three computers therefore have confirmation that the other two computers have also received the event. The event is transmitted to the processing electronics of the three computers in the temporal order defined by the stamp.

In the case of FIG. 5, on receipt of an event, the three instances AIM1, AIM2 and AIM3 send their respective signals ACK to the other two instances. However, as seen in FIG. 5, the sending of the signal ACK sent by the instance AIM2 does not reach the instance AIM3. This defect is symbolized by an explosion in FIG. 5. At the instant "TimeOut ACK", the instance AIM3 has not received any signal from the instance AIM2. Consequently, it sends a failure signal "FAIL" to AIM1 and AIM2. At the instant termed "TimeOut GARANTEED", the three computers have therefore received a failure signal. No event is transmitted to any of the processing electronics of the three computers. This absence of transmission is symbolized by the "no entry" sign in FIG. 5. Thus, there is no risk of malfunction. As soon as there is a problem, the set of computers no longer takes the events into account.

When the problem persists, that is to say when several successive events are not taken into account, the avionics system forewarns the pilot who can either reboot the whole system or switch off the failed electronic computer.

The electronic computers operate in a cyclic manner. The implementation of the method according to the invention requires about five cycles between the reception of the physical event and the possible taking into account by the various processing electronics of the electronic computers, this being small and only slightly delaying the taking into account of the event by the processing electronics. The order of magnitude of the time taken to guarantee the event is of the order of a few tens of milliseconds.

When two events of the same functional value are sent successively, the second event is taken into account by the AIM software layers of the electronic computers only if the previous event is abandoned or processed by the data processing electronics of the said electronic computers. In the converse case the event is ignored. No temporal stamping of the events by the man-machine control interfaces is necessary. Here again, this means that it is necessary to wait about five cycles in order for a second event to be taken into account by the system.

The method according to the invention requires only elementary operations and is simple to implement. By way of example, it requires about 500 lines of code in the C language.

For computers distributed within one and the same system whose behaviour is defined by common events, the solution according to the invention solves the problems of synchronization and of integrity, in the sense of the coherence of the system.

The method according to the invention makes it possible to afford a solution which does not depend on the behaviour strictly speaking of the system. It applies the principle of so-called "separation of concern", since it applies only to the expected properties of the events and not to their functional definition.

This exhibits two major advantages which are:
Simplicity: the solution is technical and non-functional.
Longevity: the solution does not depend on the product.
Moreover, the nature of the technical solution possesses intrinsic qualities:
  It is entirely symmetric: none of the instances is different from the other instances. The logical clock is assigned only at a given instant and does not favour any part of the system to the detriment of another.
  It does not comprise any "loop": the strategy of waiting for failure introduces a purely linear processing, which does not rely on any cyclic dependency. The behaviour is deterministic. Proof of good behaviour of the system is facilitated, thus improving the dependability of the system.
  Its latency is minimal. The latency introduced is the theoretical minimum latency achievable for processing a coherence error on a distributed system.
  It avoids introducing errors. The strategy adopted is to not let any incoherence enter the system. The remainder of the design of the system is thereby greatly simplified. The synchronism errors and integrity errors do not need to be processed elsewhere.
  It allows the detection of incoherence of the system. By managing low-level errors, the algorithm implemented makes it possible to identify the failing elements. An architecture for processing failures of higher level can then tap into these results.

The invention claimed is:

1. A method of guaranteed reception and of processing of an external event in the form of a digital signal in an avionics system comprising a plurality of electronic computers linked together by a data bus, each computer comprising data processing electronics, wherein each electronic computer comprises one and the same software layer, which, on receipt of an external event, carries out the following steps:
    at a first instant, sending, to each of the other electronic computers, a first signal (ACK) attesting the reception of said external event by said electronic computer, one and only one of the electronic computers sending a stamp representative of said first instant;
    at a second instant termed "TimeOut ACK", when said electronic computer has not received at least one of the first signals emanating from one of the other electronic computers, sending a second failure signal (FAIL) to each of the other electronic computers attesting the absence of reception of said first signal; and
    at a third instant termed "TimeOut GUARANTEED", when a second failure signal has been received by said electronic computer, not taking into account the external event by said plurality of electronic computers, and when no failure signal has been received by said electronic computer, taking into account the external event, according to a temporal order defined by the stamp, by the data processing electronics of said electronic computer,
    wherein the external event is external with respect to the plurality of electronic computers, and
    wherein the plurality of electronic computers operating in a cyclic manner, a number of cycles elapsing between reception of a physical event, and taking into account by various processing electronics of the electronic computers is of the order of five.

2. The method of guaranteed reception and of processing of an external event according to claim 1, wherein, when two events of the same functional value are sent successively, the second event is taken into account by the software layers of the electronic computers only when the previous event is abandoned or processed by the data processing electronics of said electronic computers.

3. The method of guaranteed reception and of processing of an external event according to claim 1, wherein the external event emanates from the man-machine control interfaces of the avionics system.

4. The method of guaranteed reception and of processing of an external event according to claim 1, wherein the external event corresponds to a user interacting with the avionics system via a user interface.

5. The method of guaranteed reception and of processing of an external event according to claim 1, wherein the software layer manages asynchronism and integrity.

* * * * *